US012486694B2

(12) United States Patent
Von Matern

(10) Patent No.: US 12,486,694 B2
(45) Date of Patent: Dec. 2, 2025

(54) ARRANGEMENT FOR LOCK DEVICE, LOCK DEVICE COMPRISING ARRANGEMENT, AND METHOD

(71) Applicant: ASSA ABLOY AB, Stockholm (SE)

(72) Inventor: Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 412 days.

(21) Appl. No.: 18/022,946

(22) PCT Filed: Aug. 16, 2021

(86) PCT No.: PCT/EP2021/072721

§ 371 (c)(1),
(2) Date: Feb. 23, 2023

(87) PCT Pub. No.: WO2022/043112

PCT Pub. Date: Mar. 3, 2022

(65) Prior Publication Data

US 2023/0313564 A1 Oct. 5, 2023

(30) Foreign Application Priority Data

Aug. 26, 2020 (SE) .................................... 2050988-1

(51) Int. Cl.
*E05B 47/00* (2006.01)
*E05B 47/06* (2006.01)

(52) U.S. Cl.
CPC ...... *E05B 47/0006* (2013.01); *E05B 47/0038* (2013.01); *E05B 47/0607* (2013.01);
(Continued)

(58) Field of Classification Search
CPC ............. E05B 47/0002; E05B 47/0003; E05B 47/0005; E05B 47/0038; E05B 47/06;
(Continued)

(56) References Cited

U.S. PATENT DOCUMENTS 4,501,980 A * 2/1985 Welburn ................ H02K 37/02 318/135
5,474,339 A * 12/1995 Johnson .................. E05B 81/16 292/201

(Continued)

FOREIGN PATENT DOCUMENTS

DE 479949 7/1929
EP 0759625 2/1997

(Continued)

OTHER PUBLICATIONS

Official Action for Sweden Patent Application No. 2050988-1, dated Mar. 25, 2021, 40 pages.

(Continued)

*Primary Examiner* — Christine M Mills
*Assistant Examiner* — Faria F Ahmad
(74) *Attorney, Agent, or Firm* — Schwegman Lundberg & Woessner, P.A.

(57) ABSTRACT

An arrangement (10, 82) for locking and unlocking a lock device (58, 74), the arrangement (10, 82) comprising a transfer element (12) movable between a protruded position (42) and a retracted position (56); a core member (14) of soft magnetic material, the core member (14) comprising a coil section (20); an electric coil (16) wound around the coil section (20); and a blocking member (48) comprising a magnet (18), the blocking member (48) being movable between a blocking position (50), in which the magnet (18) establishes a magnetic circuit through the coil section (20) and the blocking member (48) blocks movement of the transfer element (12) to the retracted position (56), and an unblocking position (54), in which the magnet (18) establishes a magnetic circuit through the coil section (20) and the blocking member (48) unblocks movement of the transfer element (12) to the retracted position (56). A lock device (58, (Continued)

74) comprising an arrangement (10, 82), and a method of controlling a lock device (58, 74), are also provided.

16 Claims, 9 Drawing Sheets

(52) U.S. Cl.
CPC ................. *E05B 2047/0054* (2013.01); *E05B 2047/0079* (2013.01)

(58) Field of Classification Search
CPC ......... E05B 47/0607; E05B 2047/0073; E05B 2047/0074; E05B 2047/0076; E05B 2047/0079; E05B 17/2007; E05B 17/203; E05B 17/2034
See application file for complete search history.

(56) References Cited

U.S. PATENT DOCUMENTS

| | | | | |
|---|---|---|---|---|
| 6,639,496 | B1 * | 10/2003 | van Namen | H01F 7/1615 335/229 |
| 8,866,349 | B2 * | 10/2014 | Li | H01H 3/28 310/23 |
| 8,912,871 | B2 * | 12/2014 | Lauraire | H01H 3/28 335/229 |
| 8,975,992 | B2 * | 3/2015 | Bottcher | H01F 7/1623 335/229 |
| 10,253,528 | B1 * | 4/2019 | Pukari | G07C 9/00174 |
| 10,298,037 | B2 * | 5/2019 | Wang | H01R 13/6205 |
| 10,488,173 | B2 * | 11/2019 | Sugawara | H01F 7/16 |
| 10,851,907 | B2 * | 12/2020 | Wardle | H01F 7/081 |
| 12,359,464 | B2 * | 7/2025 | Piirainen | E05B 47/0004 |
| 2002/0158727 | A1 * | 10/2002 | Namen | H01F 7/1615 335/78 |
| 2005/0052265 | A1 * | 3/2005 | Vladimirescu | H01F 7/1615 335/229 |
| 2008/0100152 | A1 * | 5/2008 | Busch | E05F 15/60 310/12.25 |
| 2009/0072636 | A1 * | 3/2009 | Gruden | H01F 7/1615 310/14 |
| 2009/0218902 | A1 * | 9/2009 | Mohler | H02K 21/44 310/156.33 |
| 2010/0313615 | A1 * | 12/2010 | Chen | E05B 47/026 70/276 |
| 2015/0225983 | A1 | 8/2015 | Alzingre et al. | |
| 2018/0202189 | A1 * | 7/2018 | Fonteneau | E05B 13/00 |
| 2019/0249466 | A1 | 8/2019 | Kothe et al. | |
| 2020/0392758 | A1 * | 12/2020 | Elsmark | E05B 47/068 |
| 2021/0207399 | A1 * | 7/2021 | Piirainen | H01F 7/0221 |
| 2022/0341218 | A1 * | 10/2022 | Piirainen | H01F 7/0226 |
| 2025/0116134 | A1 * | 4/2025 | Tikkanen | E05B 47/0038 |

FOREIGN PATENT DOCUMENTS

| | | |
|---|---|---|
| EP | 1030010 | 8/2000 |
| WO | WO 2004/072418 | 8/2004 |
| WO | WO 2006/109299 | 10/2006 |
| WO | WO 2016/034049 | 3/2016 |

OTHER PUBLICATIONS

International Search Report and Written Opinion for International (PCT) Patent Application No. PCT/EP2021/072721, dated Dec. 13, 2021, 13 pages.

* cited by examiner

ARRANGEMENT FOR LOCK DEVICE, LOCK DEVICE COMPRISING ARRANGEMENT, AND METHOD

CROSS REFERENCE TO RELATED APPLICATIONS

This application is a national stage application under 35 U.S.C. 371 and claims the benefit of PCT Application No. PCT/EP2021/072721 having an international filing date of Aug. 16, 2021, which designated the United States, which PCT application claimed the benefit of Sweden Patent Application No. 2050988-1 filed Aug. 26, 2020, the disclosure of each of which are incorporated herein by reference.

TECHNICAL FIELD

The present disclosure generally relates to an arrangement for a lock device. In particular, an arrangement for locking and unlocking a lock device, which arrangement comprises a magnet movable between a blocking position and an unblocking position, a lock device comprising an arrangement, and a method of controlling a lock device, are provided.

BACKGROUND

Various types of actuators may be used in lock devices. One type of powered actuator is a motor that rotates a drive shaft for locking and unlocking a lock device, for example an electric strike. Another type of powered actuator is a solenoid which has a plunger that moves relative to a housing in response to power being supplied. Such solenoids may be provided with a spring to return the plunger to its original position without power. The solenoid includes a coil and a shaft which is axially movable within the coil. The coil is energized by connection to a source of electrical current and thereby generates magnetic flux which influences the shaft to move in one direction. When the coil is de-energized, the spring operates to move the shaft in the reverse direction. One advantage with solenoids over motors is that in a power failure event, the plunger can still return to its original position.

US 2015225983 A1 discloses a locking device including a mobile locking member, movement of which can be prevented by a blocking member interacting with a motorized lever, where the motorized lever is capable of rotational movement about an axis with respect to the supporting structure, the centre of gravity of the lever lying on the axis, the lever being kept in a determined stable position and without rigid mechanical contact of the lever with the supporting structure apart from its axis of rotation.

SUMMARY

One object of the present disclosure is to provide an arrangement for locking and unlocking a lock device, which arrangement has a low energy consumption.

A further object of the present disclosure is to provide an arrangement for locking and unlocking a lock device, which arrangement has a less complicated design and/or operation.

A still further object of the present disclosure is to provide an arrangement for locking and unlocking a lock device, which arrangement is cost effective.

A still further object of the present disclosure is to provide an arrangement for locking and unlocking a lock device, which arrangement has a small size.

A still further object of the present disclosure is to provide an arrangement for locking and unlocking a lock device, which arrangement has a reliable design and/or operation.

A still further object of the present disclosure is to provide an arrangement for locking and unlocking a lock device, which arrangement solves several or all of the foregoing objects in combination.

A still further object of the present disclosure is to provide a lock device comprising an arrangement, which lock device solves one, several or all of the foregoing objects.

A still further object of the present disclosure is to provide a method of controlling a lock device, which method solves one, several or all of the foregoing objects.

According to one aspect, there is provided an arrangement for locking and unlocking a lock device, the arrangement comprising a transfer element movable between a protruded position and a retracted position; a core member of soft magnetic material, the core member comprising a coil section; an electric coil wound around the coil section; and a blocking member comprising a magnet, the blocking member being movable between a blocking position, in which the magnet establishes a magnetic circuit through the coil section and the blocking member blocks movement of the transfer element to the retracted position, and an unblocking position, in which the magnet establishes a magnetic circuit through the coil section and the blocking member unblocks movement of the transfer element to the retracted position.

The position of the blocking member, i.e. in the blocking position or the unblocking position, affects whether the transfer element can be retracted, i.e. moved from the protruded position to the retracted position. Since the magnet establishes a magnetic circuit through the coil section in each of the blocking position and the unblocking position, the blocking member can be held in each of the blocking position and the unblocking position by means of a magnetic force of the magnet and without any power supply. The magnet generates a magnetic field. The blocking member may be held stationary in each of the blocking position and the unblocking position only by means of this magnetic field.

The coil and the core member form an electromagnet. By applying an electric current through the coil in a first direction, a first north pole and a first south pole appear in the core member. The magnetic field produced by the current through the coil in the first direction and the magnetic field generated by the magnet cause the blocking member to flip from the blocking position to the unblocking position. For example, a repulsive magnetic force between the first north pole of the core member and the north pole of the magnet may cause the blocking member to flip from the blocking position to the unblocking position.

By applying a current through the coil in a second direction, opposite to the first direction, a second north pole and a second south pole appear in the core member. The magnetic field produced by the current through the coil in the second direction and the magnetic field generated by the magnet cause the blocking member to flip from the unblocking position back to the blocking position. For example, a repulsive magnetic force between the second north pole of the core member and the north pole of the magnet may cause the blocking member to flip from the unblocking position back to the blocking position.

Thus, a quick electric pulse in the coil forces the blocking member to move from the blocking position to the unblocking position, and a reversed pulse causes the blocking member to move from the unblocking position to the blocking position. By pulsing the coil with the appropriate electrical polarity, the magnet will align itself with the magnetic field, also moving the blocking member. The arrangement thereby operates with very low power consumption and has a cost effective, compact and less complicated design.

When the blocking member adopts the blocking position and the transfer element is loaded from the protruded position towards the retracted position, the transfer element may contact the blocking member such that the blocking member is prevented from moving from the blocking position to the unblocking position. In this case, the transfer element is required to be unloaded to allow the blocking member to move from the blocking position to the unblocking position. On the other hand, this enables the arrangement to function with very low power consumption.

The transfer element may be a blocking element. In this case, the arrangement functions as a blocking device. The transfer element may block movement of an output member in the protruded position when the blocking member adopts the blocking position, and unblock movement of the output member when the blocking member adopts the unblocking position. When the blocking member is in the unblocking position, the output member can be moved e.g. by movement of an input member. This movement of the output member causes the transfer element to move from the protruded position to the retracted position. In this case, the protruded position and the retracted position of the transfer element constitute a locked state and an unlocked state, respectively, of the arrangement.

Alternatively, the transfer element may be a coupling element. In this case, the arrangement functions as a clutch. The transfer element may decouple an input member from an output member when the blocking member adopts the unblocking position. In this case, movement of the input member may cause the transfer element to move from the protruded position to the retracted position. The transfer element may further couple the input member to the output member when the blocking member adopts the blocking position. In this case, the transfer element is blocked by the blocking member and thereby prevented from moving from the protruded position to the retracted position. Movement and torque from the input member can then be transferred to the output member by means of the transfer element held in the protruded position by the blocking member. In this case, the protruded position and the retracted position of the transfer element constitute an unlocked state and a locked state, respectively, of the arrangement.

The blocking position and the unblocking position may constitute discrete positions of the blocking member. The core member may be made of ferromagnetic material, such as iron. The transfer element may be a rigid piece, such as a pin.

The blocking member may lie in a substantially horizontal plane, or horizontal plane. Alternatively, or in addition, the blocking member may be arranged to move between the blocking position and the unblocking position in a substantially horizontal plane, or horizontal plane.

The blocking member may be constituted by the magnet. Alternatively, the blocking member may comprise one or more parts in addition to the magnet, such as a shell enclosing the magnet.

The arrangement may further comprise a forcing device arranged to force the transfer element towards the protruded position. The forcing device may for example be a leaf spring or a coil spring.

The blocking member may be rotatable between the blocking position and the unblocking position about a rotation axis. The rotation axis may substantially coincide, or coincide, with a geometric center of the blocking member or the magnet. Alternatively, or in addition, the rotation axis may substantially coincide, or coincide, with the center of mass of the blocking member or the magnet. In case the blocking member or the magnet has a uniform density, the geometric center and the center of mass coincide.

The core member may comprise two arms. The core member may be U-shaped. The coil section may be arranged between the arms. In addition, the coil section may be elongated and each arm may extend substantially perpendicular, or perpendicular, to the coil section. Alternatively, the coil section may be constituted by one or both arms. The coil may be wound around a first arm, a second arm and/or a section between the first arm and the second arm. The coil may thus be wound around any section of the core member. The section of the core member, around which the coil is wound, constitutes a coil section.

The first arm may comprise a first finger and the second arm may comprise a second finger. The first finger and the second finger may be aligned and face each other. The first finger, the second finger and the rotation axis may lie in a common plane.

The rotation axis may be substantially centered, or centered, between the arms. Alternatively, or in addition, the magnet may be in contact with each arm in each of the blocking position and the unblocking position. Each arm thereby provides a mechanical stop defining a respective discrete position of the blocking member. The magnet will short-circuit the core member in each of the blocking position and the unblocking position. This short-circuiting causes the magnet to be stably held in each of the blocking position and the unblocking position without needing any power supply. The magnet may thus be arranged in series with the core member in each of the blocking position and the unblocking position. A short current pulse through the coil causes the magnet to flip between the blocking position and the unblocking position.

The arrangement may further comprise a base. In this case, the transfer element may be movable relative to the base, and the blocking member may be positioned between the transfer element and the base when the transfer element adopts the protruded position and the blocking member adopts the blocking position.

The blocking member may have a substantially straight, or straight, elongated shape. The magnet may have a polarization direction along a longitudinal axis of the magnet. The polarization direction may be substantially perpendicular, or perpendicular, to the rotation axis of the blocking member.

The magnet may be a permanent magnet. The magnet may for example comprise a Neodymium alloy such as a Neodymium-Iron-Boron (NdFeB), or other alloy having a relatively high intrinsic remanence. A relatively high intrinsic coercivity may be used to protect the magnet from being demagnetized by an applied external magnetic field.

The transfer element may comprise a sloped surface. The sloped surface may be arranged to engage in an aperture when the transfer element adopts the protruded position. The sloped surface may be arranged to move out from the aperture by a relative movement between the transfer element and the aperture in a displacement direction when the blocking member adopts the unblocking position.

The transfer element may be linearly movable between the protruded position and the retracted position along a transfer axis. The sloped surface may be inclined relative to the transfer axis, e.g. inclined 10 degrees to 80 degrees relative to the transfer axis. The transfer axis may be perpendicular to the displacement direction.

The transfer axis and the rotation axis may be substantially parallel, or parallel.

The arrangement may further comprise a control system, the control system comprising at least one data processing device and at least one memory having a computer program stored thereon, the computer program comprising program code which, when executed by the at least one data processing device, causes the at least one data processing device to perform the steps of evaluating an authorization request; and commanding sending of a current pulse through the coil in response to a granted evaluation of the authorization request. The computer program may further comprise program code which, when executed by the at least one data processing device, causes the at least one data processing device to perform, or command performance of, various steps as described herein.

The control system may be configured to apply a current pulse in a first direction to the coil to generate the magnetic field for moving the blocking member from the blocking position to the unblocking position, and to apply a current pulse in a second direction, opposite to the first direction, to generate the magnetic field for moving the blocking member from the unblocking position back to the blocking position. The control system may further comprise a receiving unit, such as an antenna, for receiving the authorization request. The control system may be configured to determine whether or not authorization should be granted based on the authorization request. If access is granted, e.g. if a valid credential is presented, a current pulse in the first direction is sent through the coil. The current pulse in the second direction may be sent after expiration of a predetermined time limit, e.g. 2 seconds.

According to a further aspect, there is provided a lock device comprising an arrangement according to the present disclosure. The lock device may comprise an input member and an output member. The lock device may further comprise a stationary structure, such as a housing. In case the transfer element is a blocking element, the transfer element may prevent the input member and/or the output member from being moved when the transfer element adopts the protruded position and the blocking member adopts the blocking position, and the transfer element may allow the output member to be moved by movement of the input member when the blocking member adopts the unblocking position. In case the transfer element is a coupling element, the transfer element may prevent the output member from being moved by movement of the input member when the blocking member adopts the unblocking position, and the transfer element may allow the output member to be moved by movement of the input member when the transfer element adopts the protruded position and the blocking member adopts the blocking position.

The lock device may further comprise an aperture for being engaged by the transfer element in the protruded position. The aperture may be arranged in the input member, in the output member or in the stationary structure. The input member may be rotatable or linearly movable. The output member may be rotatable or linearly movable.

In case the lock device is a lock cylinder, the lock cylinder may comprise a stationary structure having an aperture and a cylinder core rotatably accommodated in the stationary structure. When the blocking member adopts the unblocking position, the transfer element is allowed to be retracted out from the aperture from the protruded position to the retracted position and the cylinder core is thereby allowed to rotate relative to the stationary structure. When the blocking member adopts the blocking position, the transfer element is held in the protruding position engaging the aperture such that the cylinder core is prevented from rotating relative to the stationary structure.

The lock device may be an energy harvesting lock device. To this end, the lock device may further comprise an electric generator arranged to generate electric energy from movement of the input member. In this case, the lock device may be arranged to power the control system by means of harvested electric energy. The energy harvesting lock device may not comprise a battery.

The lock device may for example be a lock cylinder, a lock case, a pad lock, a keypad locker lock, a strike assembly, or a handle device for operating doors, windows and the like. Other implementations are conceivable.

According to a further aspect, there is provided a method of controlling a lock device, the method comprising providing a lock device according to the present disclosure; evaluating an authorization request; and sending a current pulse through the coil in response to a granted evaluation of the authorization request. The lock device for the method may be of any type according to the present disclosure.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
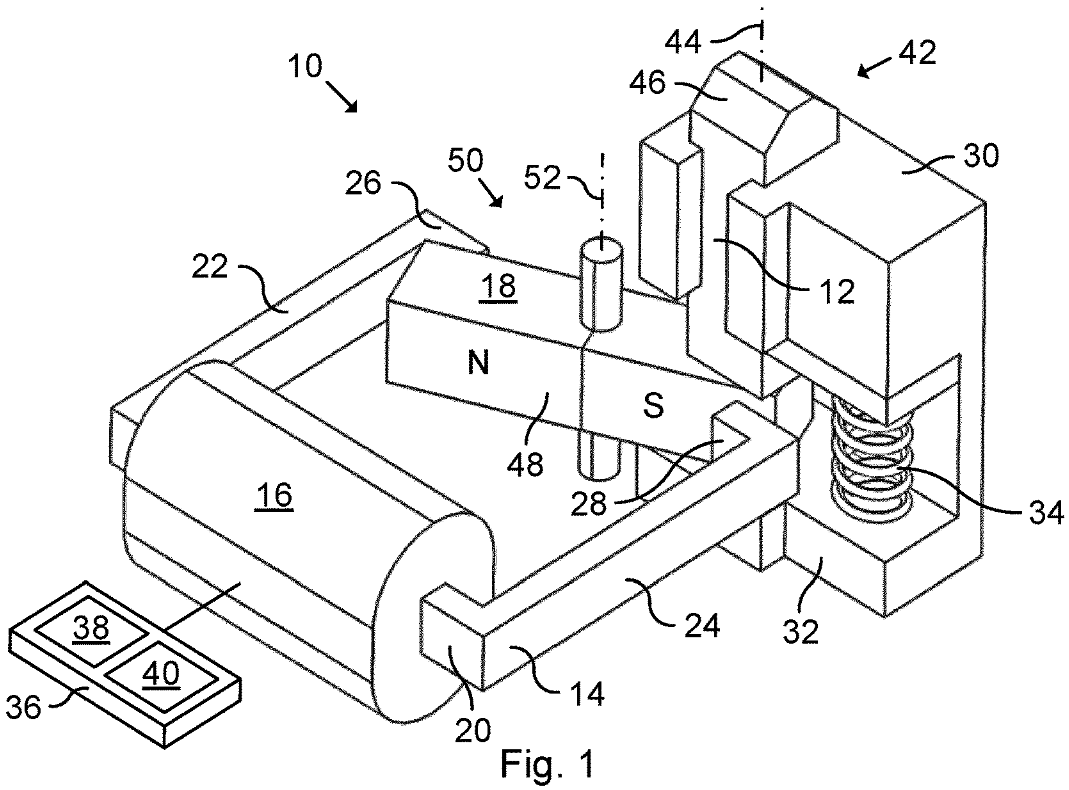
FIG. 1: schematically represents a first perspective view of an arrangement when a magnet is in a blocking position and a transfer element is in a protruded position.

In the following, an arrangement for locking and unlocking a lock device, which arrangement comprises a magnet movable between a blocking position and an unblocking position, a lock device comprising an arrangement, and a method of controlling a lock device, will be described. The same or similar reference numerals will be used to denote the same or similar structural features.

Figure 2:
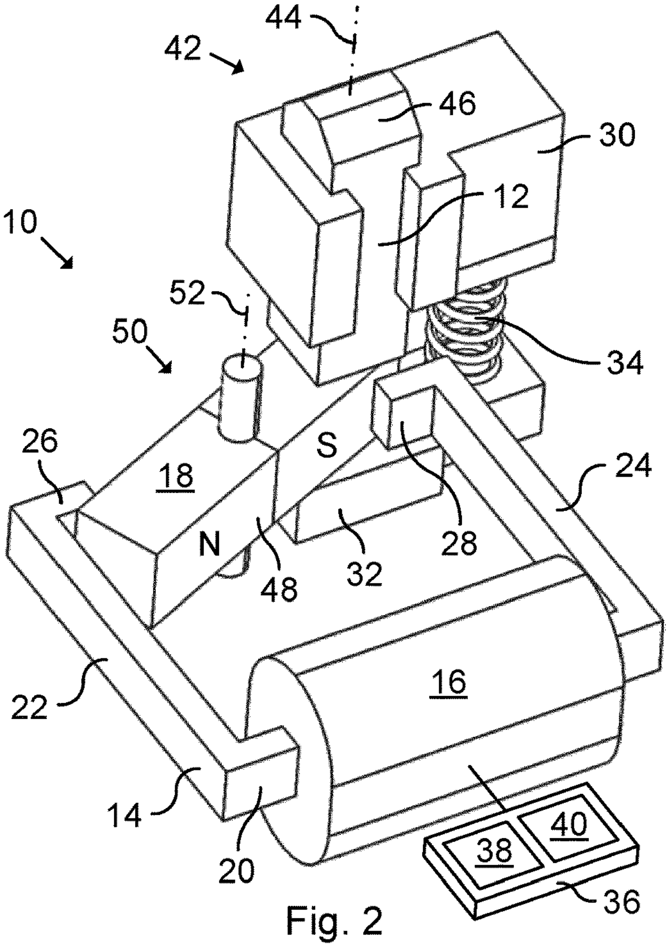
FIG. 2: schematically represents a second perspective view of the arrangement in FIG. 1.

FIG. 1 schematically represents a first perspective view of an arrangement 10 for a lock device, and FIG. 2 schematically represents a second perspective view of the arrangement 10 in FIG. 1. With collective reference to FIGS. 1 and 2, the arrangement 10 comprises a transfer element 12, a core member 14, an electric coil 16 and a magnet 18.

The core member 14 comprises a coil section 20. The coil 16 is wound around the coil section 20. The coil 16 and the core member 14 thereby form an electromagnet. The number of windings of the coil 16 may vary. The coil 16 may comprise copper wirings. The core member 14 of this example further comprises a first arm 22 and a second arm 24. The first arm 22 ends with a first finger 26 and the second arm 24 ends with a second finger 28. The first finger 26 and the second finger 28 are aligned and face towards each other.

The coil section 20 is elongated and arranged between the arms 22, 24. Each of the arms 22, 24 extends perpendicular to the coil section 20. The core member 14 of this example is thereby generally U-shaped. The core member 14 is made of iron.

The arrangement 10 of this example further comprises a support section 30. The support section 30 comprises a base 32.

The arrangement 10 of this example further comprises a spring 34, here exemplified as a coil spring. The spring 34 is one example of a forcing device according to the present disclosure. The spring 34 is arranged between the transfer element 12 and the base 32.

The arrangement 10 further comprises a control system 36. The control system 36 comprises a data processing device 38 and a memory 40. The memory 40 has a computer program stored thereon. The computer program comprises program code which, when executed by the data processing device 38, causes the data processing device 38 to evaluate an authorization request, and command sending of a current pulse through the coil 16 in response to a granted evaluation of the authorization request. The computer program further comprises program code, which when executed by the data processing device 38, causes the data processing device 38 to perform, or command performance of, various steps as described herein.

The control system 36 is configured to apply current pulses to the coil 16 such that magnetic fields are generated. To this end, the control system 36 may comprise a power controller (not shown), e.g. having switches, a pulse control transistor and a flyback diode for protecting the pulse control transistor. The power controller may be connected to a charged capacitor optimized for the specific pulse to the coil 16.

The transfer element 12 is movable between a protruded position 42 and a retracted position. In FIGS. 1 and 2, the transfer element 12 is in the protruded position 42. In this example, the transfer element 12 is linearly movable between the protruded position 42 and the retracted position along a transfer axis 44 and relative to the support section 30. The transfer axis 44 of this example is vertically oriented. The transfer element 12 of this example is a rigid member.

The transfer element 12 of this example comprises two sloped surfaces 46. In the protruded position 42, each sloped surface 46 protrudes with respect to the support section 30. In this example, each sloped surface 46 is angled 45 degrees relative to the transfer axis 44. That is, one sloped surface 46 is angled +45 degrees relative to the transfer axis 44 and one sloped surface 46 is angled −45 degrees relative to the transfer axis 44.

In this example, the magnet 18 constitutes a blocking member 48. Thus, the magnet 18 and the blocking member 48 are the same component. In some alternative embodiments, the blocking member 48 may comprises one or more components in addition to the magnet 18, such as a shell enclosing the magnet 18. The magnet 18 is here a permanent magnet.

The arrangement 10 may be arranged in a steel housing (not shown) in order to protect the magnet 18 from an external magnetic field. As shown in FIGS. 1 and 2, the arrangement 10 has a compact design.

The magnet 18 is movable between a blocking position 50 and an unblocking position. In FIGS. 1 and 2, the magnet 18 is in the blocking position 50. In the blocking position 50, the magnet 18 is positioned between the transfer element 12 and the base 32. The magnet 18 thereby blocks the transfer element 12 from moving to the retracted position. A small gap (not denoted) is provided between the transfer element 12 and the magnet 18, and between the magnet 18 and the base 32.

Since the magnet 18 is in contact with each of the arms 22, 24 in the blocking position 50, a closed magnetic circuit is established through the magnet 18, through the first arm 22, through the coil section 20, through the second arm 24 and back to the magnet 18. The magnet 18 is thereby stably held in the blocking position 50 due to the magnetic field generated by the magnet 18. No power supply is required to hold the magnet 18 in the blocking position 50.

In this example, the magnet 18 is rotatable between the blocking position 50 and the unblocking position about a rotation axis 52. The rotation axis 52 and the transfer axis 44 are parallel. The magnet 18 of this example thus lies in a horizontal plane. As shown in FIGS. 1 and 2, the first finger 26, the second finger 28 and the rotation axis 52 lie in a common plane.

The magnet 18 of this example is straight and elongated. More specifically, the magnet 18 has a rectangular cuboid shape and a polarization direction parallel with a longitudinal axis of the magnet 18. The rotation axis 52 coincides with a geometric center and a center of mass of the magnet 18. Moreover, the rotation axis 52 is centered between the arms 22, 24, here centered between the respective fingers 26, 28. In the blocking position 50, the magnet 18 is in contact with each arm 22, 24. More specifically, a north pole “N” of the magnet 18 is in contact with the first finger 26 and a south pole “S” of the magnet 18 is in contact with the second finger 28.

Figure 3:
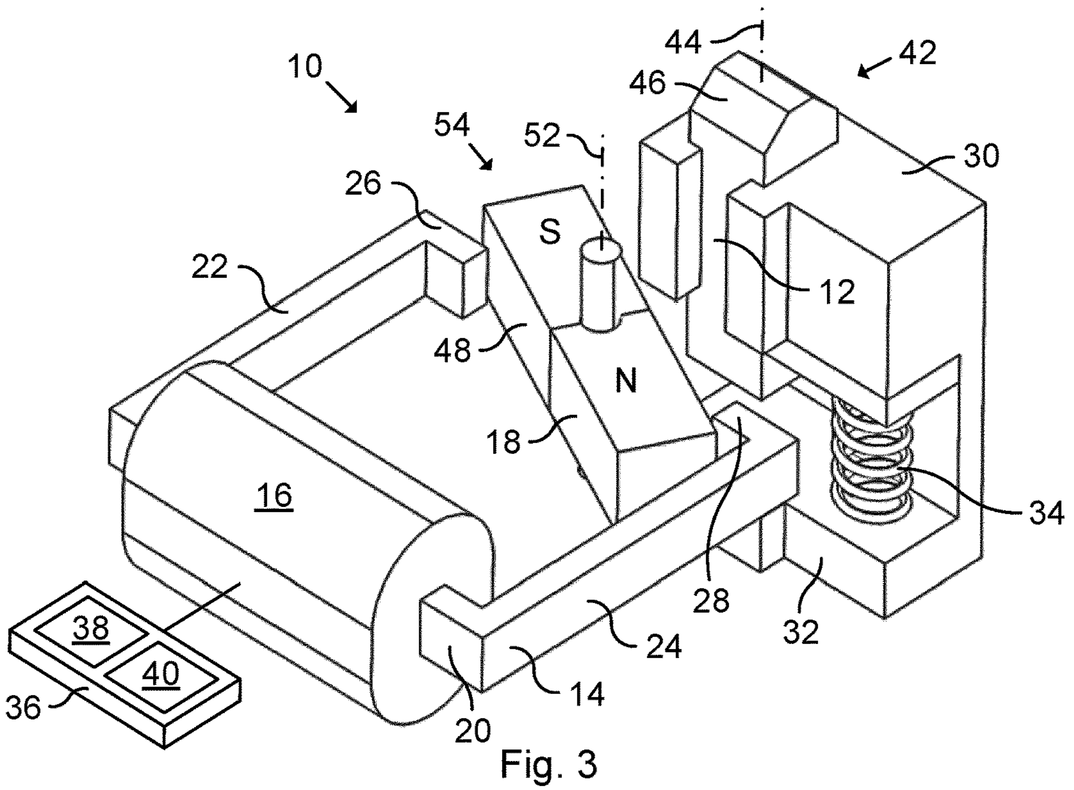
FIG. 3: schematically represents a first perspective view of the arrangement when the magnet has moved to an unblocking position.
Figure 4:
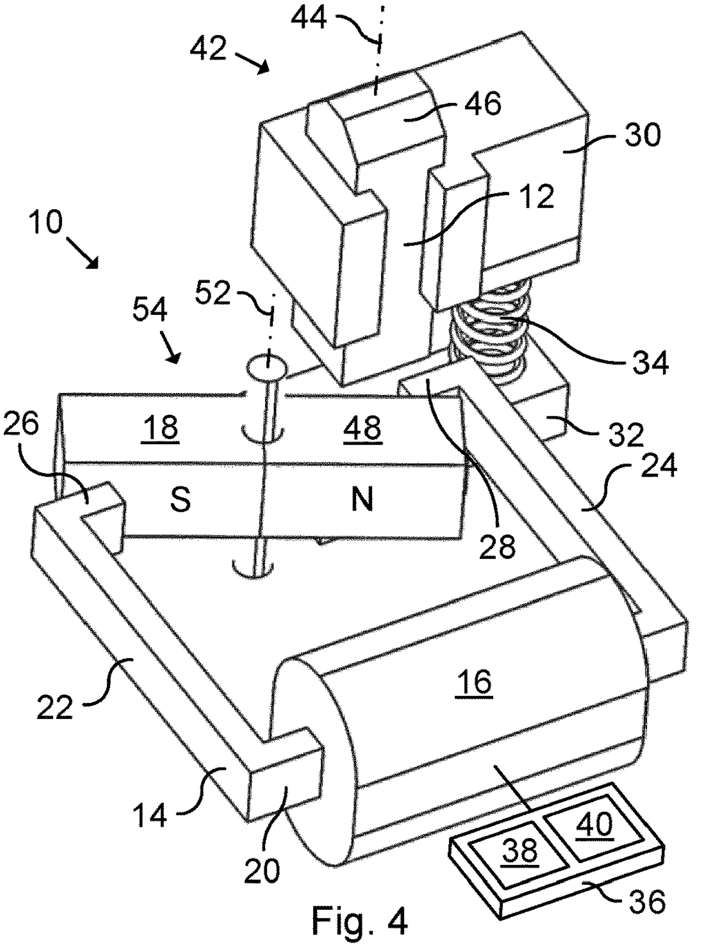
FIG. 4: schematically represents a second perspective view of the arrangement in FIG. 3.

FIG. 3 schematically represents a first perspective view of the arrangement 10 when the magnet 18 has moved to the unblocking position 54, and FIG. 4 schematically represents a second perspective view of the arrangement 10 in FIG. 3. With collective reference to FIGS. 3 and 4, by applying a current pulse to the coil 16 of sufficient duration and level in a first direction, a magnetic field is generated that flips the magnet 18 from the blocking position 50 to the unblocking position 54. More specifically, the current pulse in the first direction through the coil 16 makes the first finger 26 a north pole and the second finger 28 a south pole. The north pole of the core member 14 repels the north pole of the magnet 18 and the south pole of the core member 14 repels the south pole of the magnet 18 causing the magnet 18 to rotate about the rotation axis 52 from the blocking position 50 to the unblocking position 54. The magnet 18 is thereby flipped from the blocking position 50 to the unblocking position 54 with extremely low power consumption.

In the unblocking position 54, the magnet 18 is no longer positioned between the transfer element 12 and the base 32. The magnet 18 does therefore not block the transfer element 12 from moving to the retracted position. Moreover, since the magnet 18 is in contact with each of the arms 22, 24 also in the unblocking position 54, a closed magnetic circuit is established through the magnet 18, through the second arm 24, through the coil section 20, through the first arm 22 and back to the magnet 18. The magnet 18 is thereby stably held in the unblocking position 54 due to the magnetic field generated by the magnet 18. No power supply is required to hold the magnet 18 in the unblocking position 54.

In the unblocking position 54, the magnet 18 is in contact with each arm 22, 24. More specifically, the north pole of the magnet 18 is in contact with the second finger 28 and the south pole of the magnet 18 is in contact with the first finger 26. The magnet 18 is thus electromagnetically pivoted between two defined discrete positions constituted by the blocking position 50 and the unblocking position 54.

In the blocking position 50, the magnet 18 is in contact with a first side of the first finger 26 and in contact with a second side of the second finger 28. In the unblocking position 54, the magnet 18 is in contact with a second side of the first finger 26, opposite to the first side of the first finger 26, and in contact with a first side of the second finger 28, opposite to the second side of the second finger 28.

Figure 5:
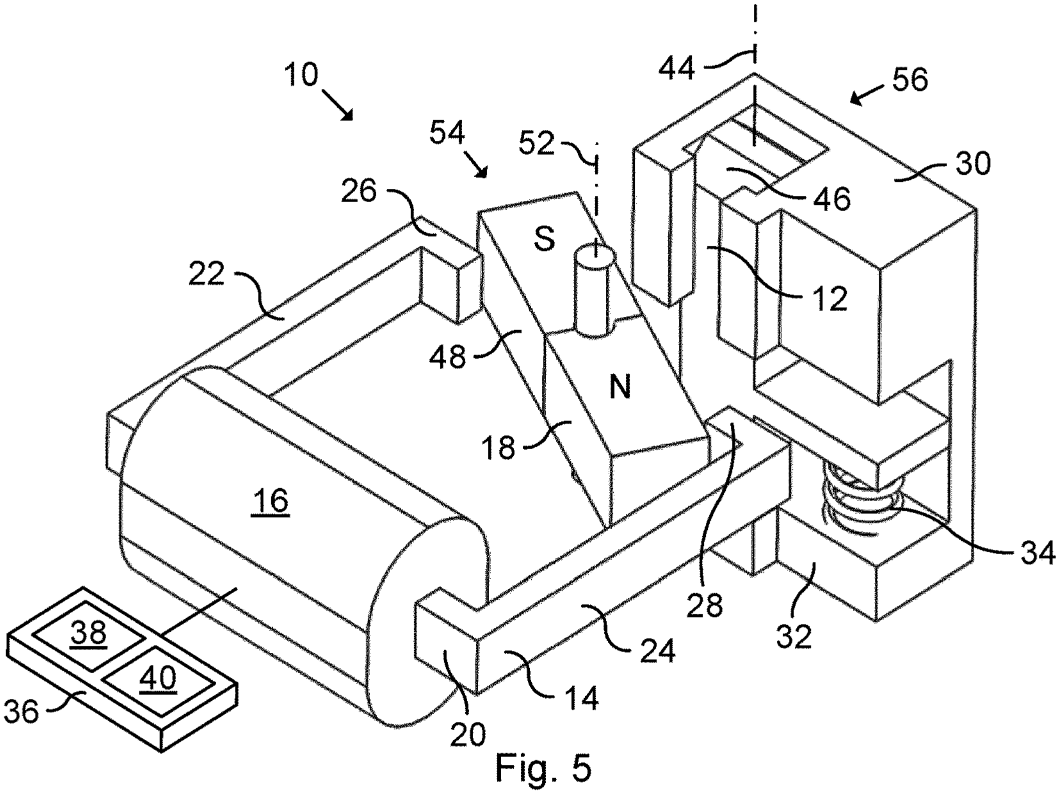
FIG. 5: schematically represents a first perspective view of the arrangement when the transfer element has moved to a retracted position.
Figure 6:
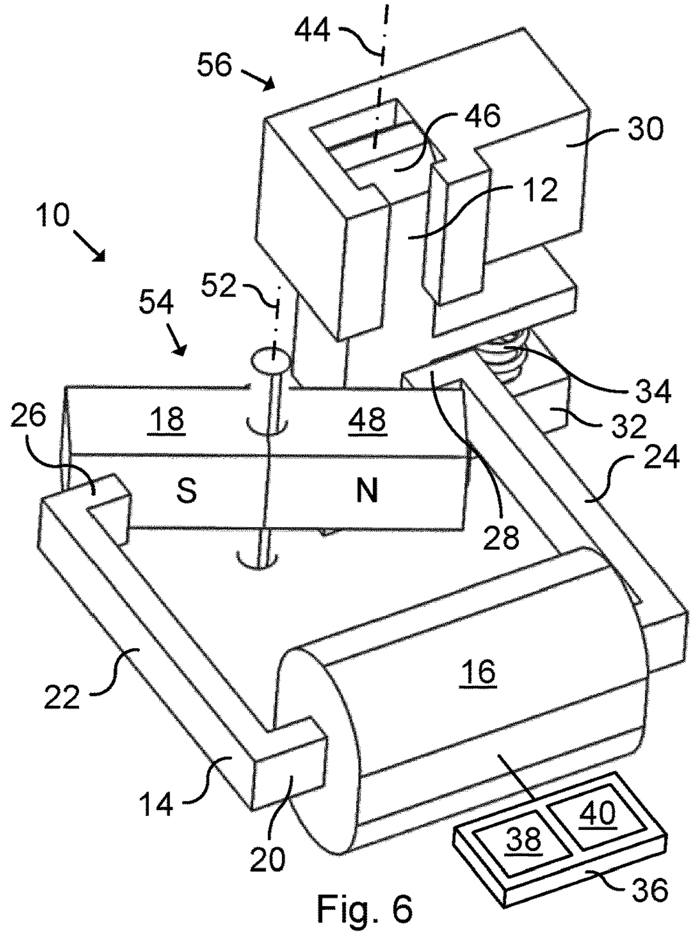
FIG. 6: schematically represents a second perspective view of the arrangement in FIG. 5.

FIG. 5 schematically represents a first perspective view of the arrangement 10 when the transfer element 12 has moved to the retracted position 56, and FIG. 6 schematically represents a second perspective view of the arrangement 10 in FIG. 5. With collective reference to FIGS. 5 and 6, when the magnet 18 adopts the unblocking position 54, the transfer element 12 is free to move from the protruded position 42 to the retracted position 56 against deformation of the spring 34.

The transfer element 12 may then move from the retracted position 56 back to the protruded position 42 by means of the spring 34. By applying a current pulse to the coil 16 of sufficient duration and level in a second direction, opposite to the first direction, a magnetic field is generated that flips the magnet 18 from the unblocking position 54 back to the blocking position 50. More specifically, the current pulse in the second direction through the coil 16 makes the first finger 26 a south pole and the second finger 28 a north pole. The north pole of the core member 14 repels the north pole of the magnet 18 and the south pole of the core member 14 repels the south pole of the magnet 18 causing the magnet 18 to rotate about the rotation axis 52 from the unblocking position 54 back to the blocking position 50.

Figure 7:
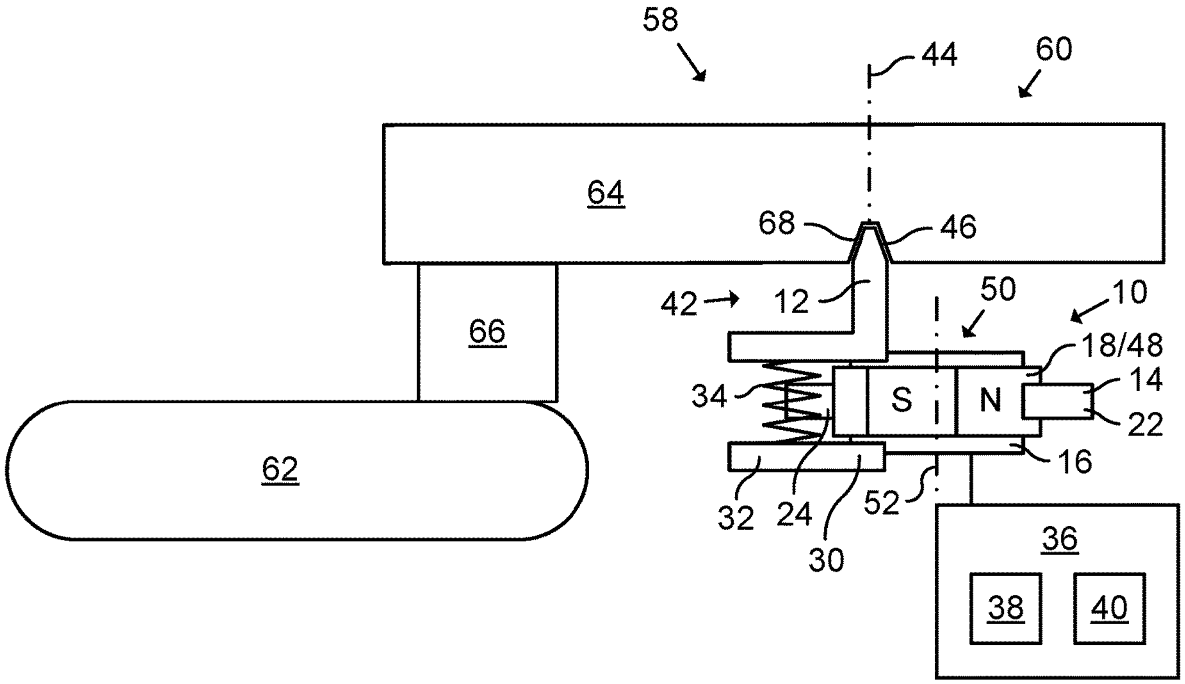
FIG. 7: schematically represents a side view of a lock device comprising the arrangement when the magnet is in the blocking position and the transfer element is in the protruded position.

FIG. 7 schematically represents a side view of a lock device 58. The lock device 58 comprises the arrangement 10 in FIGS. 1-6. In FIG. 7, the magnet 18 is in the blocking position 50 and the transfer element 12 is in the protruded position 42. The arrangement 10 is thereby in a locked state 60. The transfer element 12 here functions as a blocking element.

The lock device 58 comprises a handle 62 and a latch bolt 64. The handle 62 is one example of an input member and the latch bolt 64 is one example of an output member according to the present disclosure. In this specific example, the handle 62 is arranged to rotate and the latch bolt 64 is arranged to move linearly.

The lock device 58 further comprises a transmission 66. The transmission 66 is configured to transmit a movement of the handle 62 to a movement of the latch bolt 64. To this end, the transmission 66 may for example comprise gear wheels and/or a linkage.

The latch bolt 64 comprises an aperture 68. In the protruded position 42 of the transfer element 12, the transfer element 12 is seated in the aperture 68. The spring 34 forces the transfer element 12 into engagement with the aperture 68. The magnet 18 in the blocking position 50 prevents the transfer element 12 from moving out from the aperture 68. The transfer element 12 thereby blocks movement of the latch bolt 64.

Figure 8:
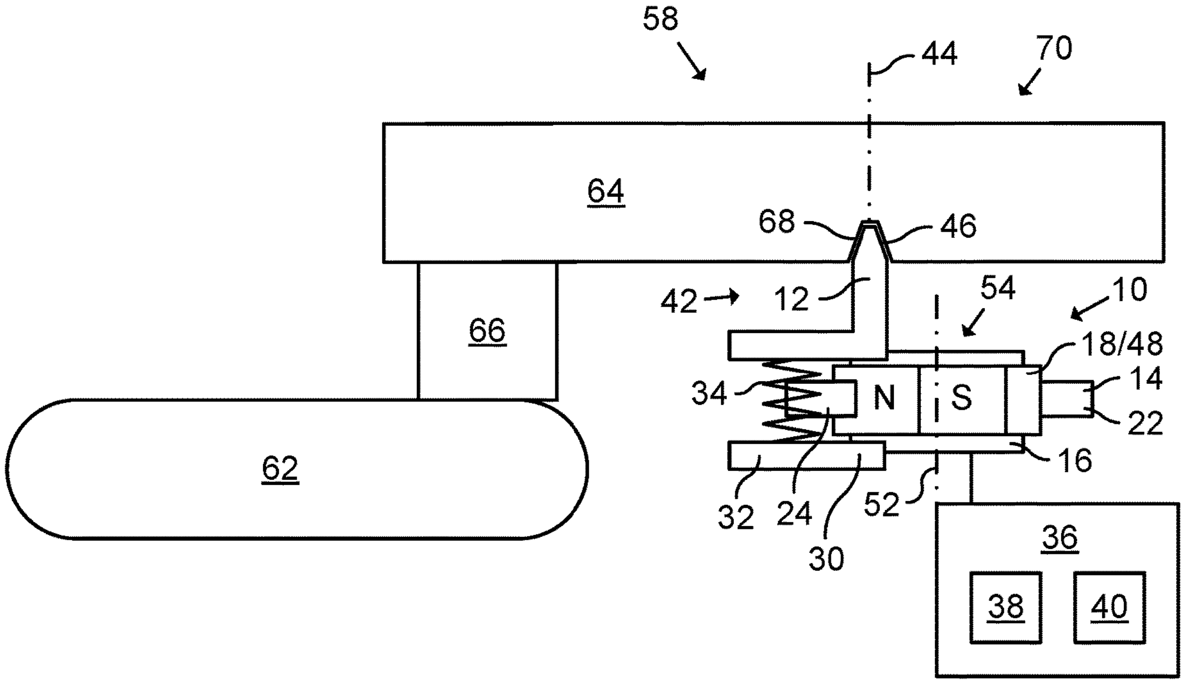
FIG. 8: schematically represents a side view of the lock device when the magnet is in the unblocking position.

FIG. 8 schematically represents a side view of the lock device 58 when the magnet 18 is in the unblocking position 54. In FIG. 8, a valid credential has been presented and the control system 36 has thereby sent a current through the coil 16 to flip the magnet 18 from the blocking position 50 to the unblocking position 54. The arrangement 10 is thereby in an unlocked state 70.

Figure 9:
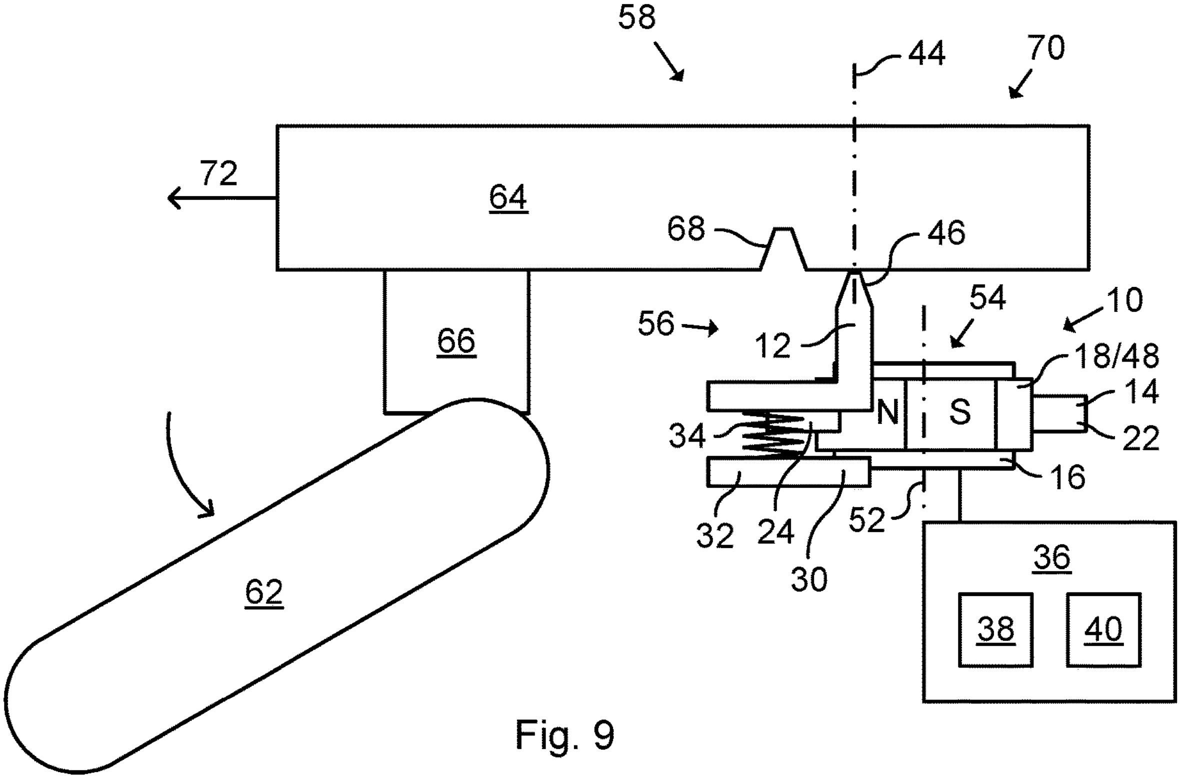
FIG. 9: schematically represents a side view of the lock device when the transfer element is in the retracted position and when an input member is manually actuated.

FIG. 9 schematically represents a side view of the lock device 58 when the transfer element 12 is in the retracted position 56 and when the handle 62 is manually actuated. The transfer element 12 thus unblocks movement of the latch bolt 64 when adopting the unblocking position 54.

In the unblocking position 54 of the transfer element 12 in FIG. 9, a rotation of the handle 62 is transferred to a linear movement of the latch bolt 64 in a displacement direction 72. The displacement direction 72 is perpendicular to the transfer axis 44. The user can thereby turn the handle 62 to retract the latch bolt 64 to open the lock device 58. The movement of the latch bolt 64 in the displacement direction 72 causes the transfer element 12, by means of the sloped surface 46, to be pushed out from the aperture 68 against the force of the spring 34. The transfer element 12 thereby moves from the protruded position 42 to the retracted position 56.

Figure 10:
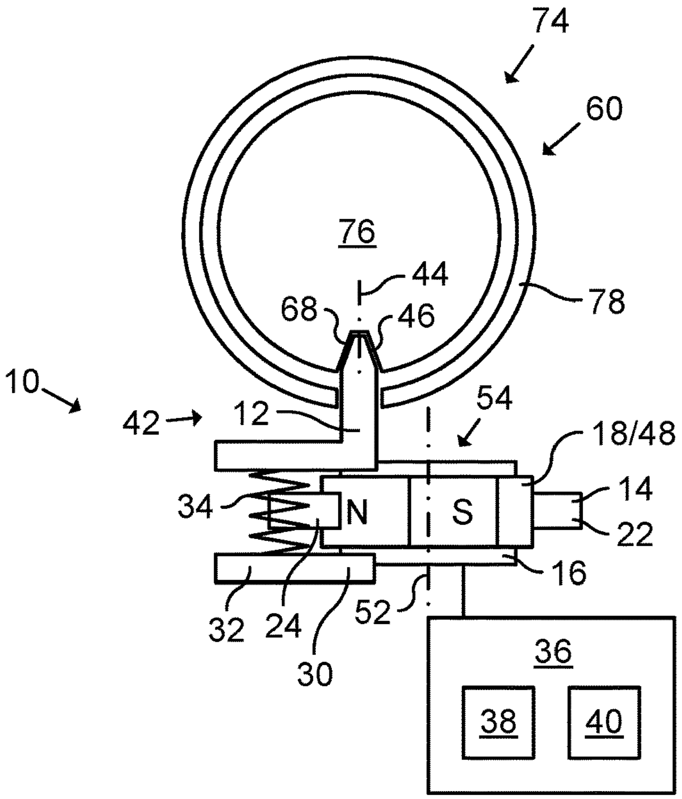
FIG. 10: schematically represents a side view of a front view of a further lock device comprising the arrangement when the magnet is in the unblocking position and the transfer element is in the protruded position.

FIG. 10 schematically represents a side view of a front view of a further lock device 74. Mainly differences with respect to FIGS. 7-9 will be described. Also the lock device 74 comprises the arrangement 10 in FIGS. 1-6. In FIG. 10, the magnet 18 is in the unblocking position 54 and the transfer element 12 is in the protruded position 42. The arrangement 10 in FIG. 10 is in a locked state 60. The transfer element 12 here functions as a coupling element.

The lock device 74 comprises a knob 76 and a locking member 78. The knob 76 is a further example of an input member and the locking member 78 is a further example of an output member according to the present disclosure. In this specific example, the knob 76 and the locking member 78 are arranged to rotate about a common rotation axis. It should be emphasized that the lock device 74 in FIG. 9 is merely schematically illustrated. In particular, the arrangement 10 may be arranged partly inside the knob 76 or partly inside the locking member 78.

In FIG. 10, the knob 76 comprises the aperture 68. In the protruded position 42 of the transfer element 12, the transfer element 12 is seated in the aperture 68. The spring 34 forces the transfer element 12 into engagement with the aperture 68. Since the magnet 18 is in the unblocking position 54, the magnet 18 does however not prevent the transfer element 12 from being retracted from the protruded position 42 to the retracted position 56.

Figure 11:
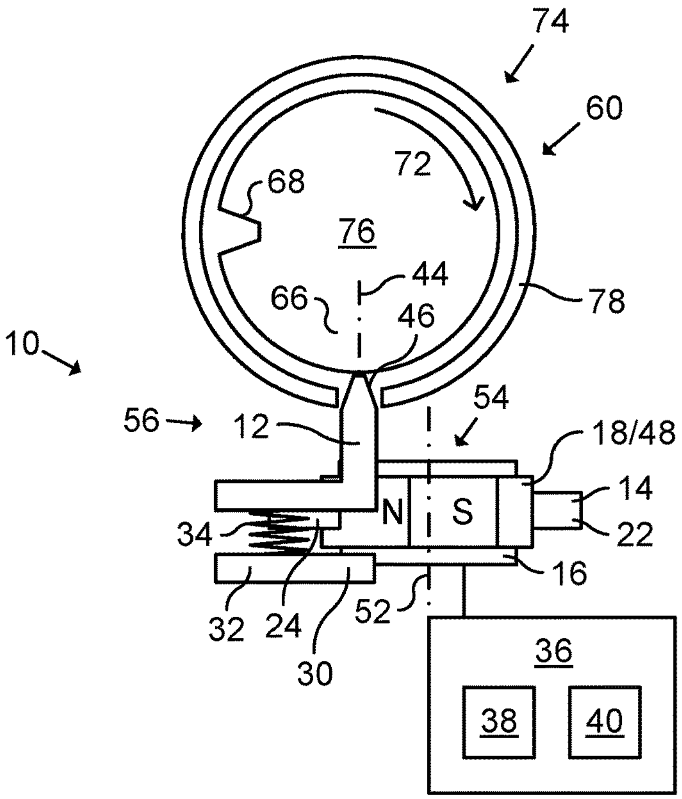
FIG. 11: schematically represents a side view of the lock device in FIG. 10 when the transfer element is in the retracted position.

FIG. 11 schematically represents a side view of the lock device 74 in FIG. 10 when the transfer element 12 is in the retracted position 56. Also in FIG. 11, the arrangement 10 is in the locked state 60. When the knob 76 is rotated in the displacement direction 72, the transfer element 12 is pushed out from the aperture 68 by means of the sloped surface 46 against the force of the spring 34. Since the magnet 18 is in the unblocking position 54, the transfer element 12 moves from the protruded position 42 to the retracted position 56. When the magnet 18 is in the unblocking position 54 in FIG. 11, a rotation of the knob 76 is thereby not transmitted to a rotation of the locking member 78. The transfer element 12 thereby decouples the knob 76 from the locking member 78 when the magnet 18 adopts the unblocking position 54.

Figure 12:
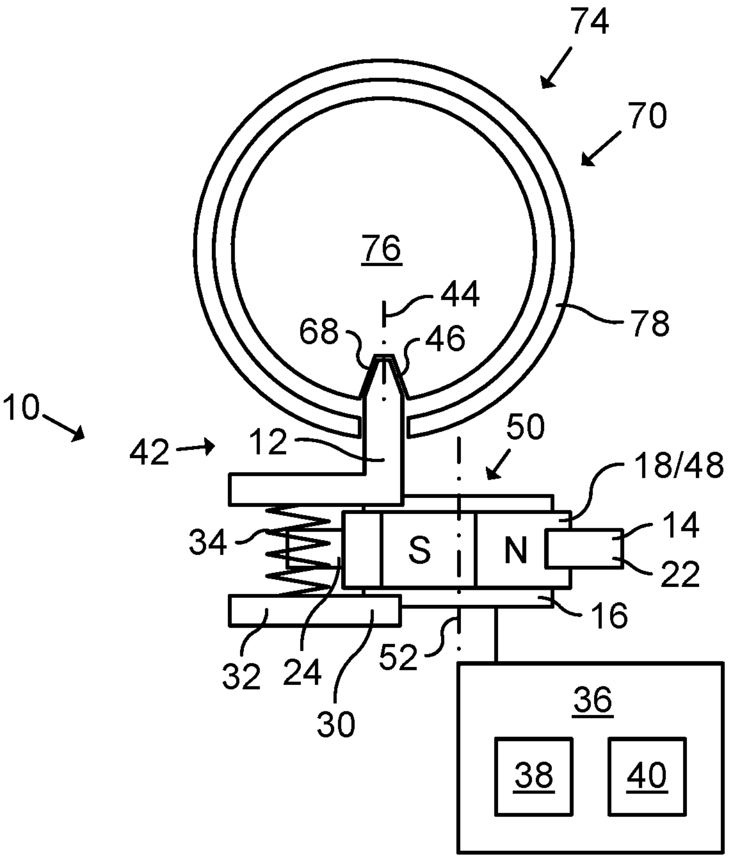
FIG. 12: schematically represents a side view of the lock device in FIGS. 10 and 11 when the magnet is in the blocking position.

FIG. 12 schematically represents a side view of the lock device 74 in FIGS. 10 and 11 when the magnet 18 is in the blocking position 50. In FIG. 12, a valid credential has been presented and the control system 36 has thereby commanded to send current through the coil 16 to flip the magnet 18 from the unblocking position 54 to the blocking position 50. The arrangement 10 is thereby in an unlocked state 70. In the unlocked state 70, the transfer element 12 couples the knob 76 to the locking member 78 since the magnet 18 prevents retraction of the transfer element 12.

Figure 13:
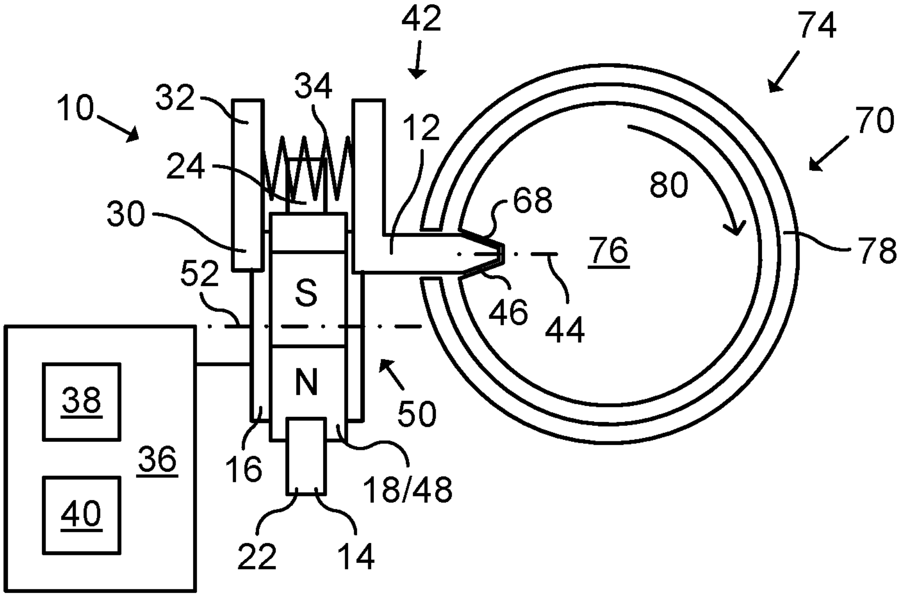
FIG. 13: schematically represents a side view of the lock device in FIGS. 10-12 when an input member is manually actuated.

FIG. 13 schematically represents a side view of the lock device 74 in FIGS. 10-12 when the knob 76 is manually actuated. Since the transfer element 12 is in the protruded position 42 engaging the aperture 68 and since the magnet 18 is in the blocking position 50 blocking the transfer element 12 from being retracted, a manual rotation of the knob 76 is transmitted by the transfer element 12 to a rotation 80 of the locking member 78. The knob 76 and the locking member 78 thereby be rotated in common to unlock the lock device 74. The arrangement 10 thereby functions as a clutch.

Figure 14:
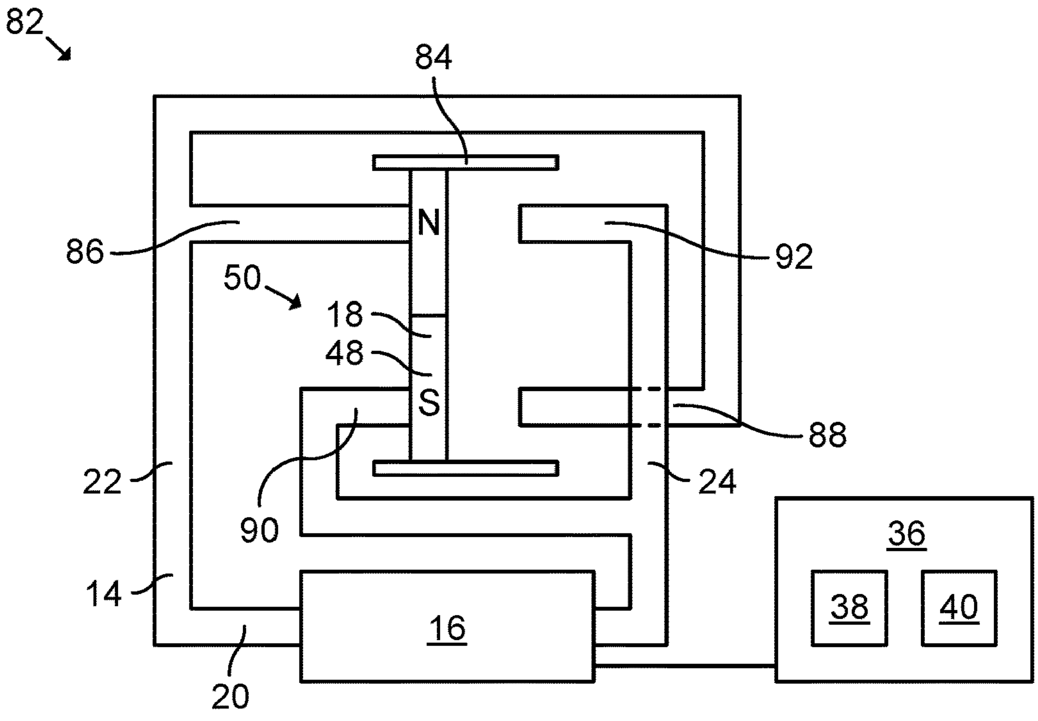
FIG. 14: schematically represents a partial top view of a further arrangement when a magnet is in a blocking position.
Figure 15:
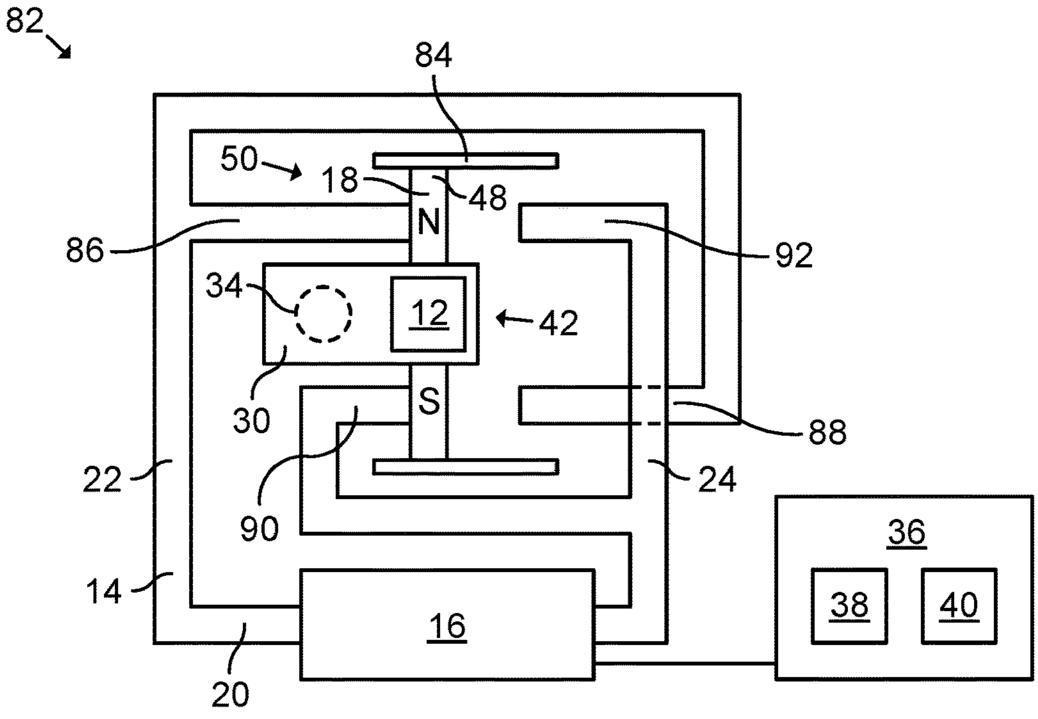
FIG. 15: schematically represents a top view of the arrangement in FIG. 14 when a transfer element is in a protruded position.
Figure 16:
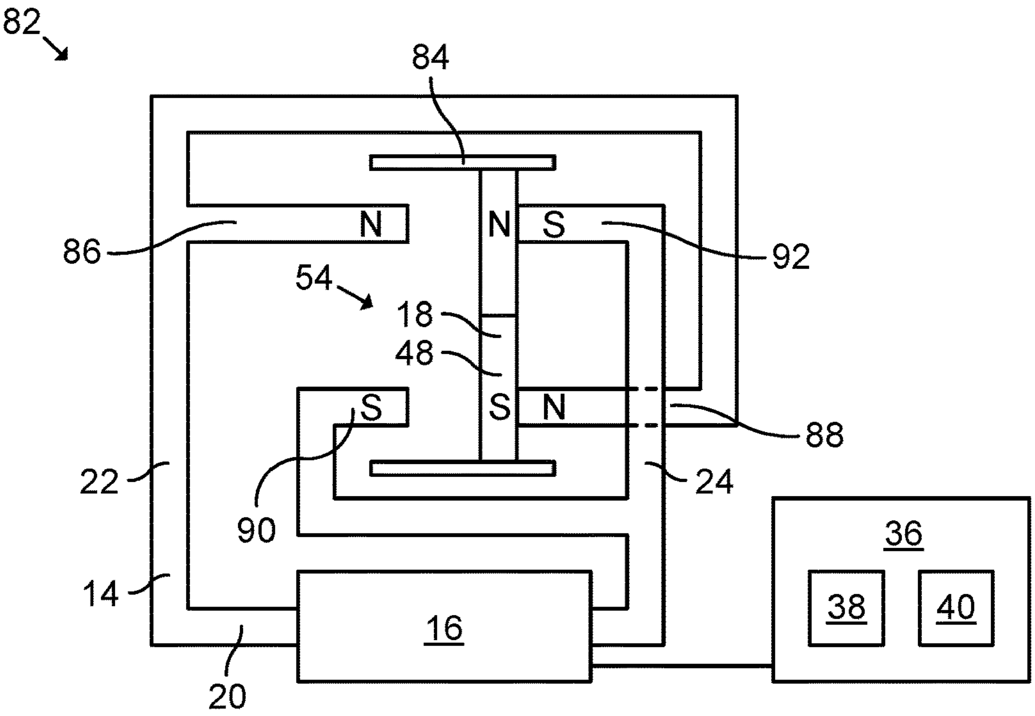
FIG. 16: schematically represents a partial top view of the arrangement in FIGS. 14 and 15 when the magnet is in an unblocking position.
Figure 17:
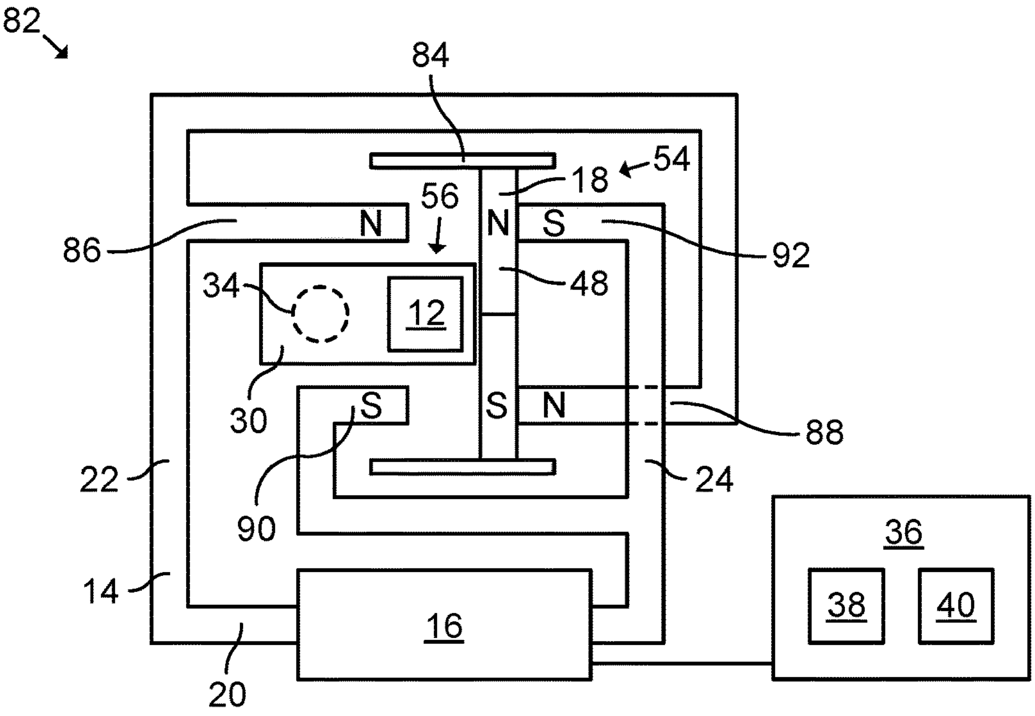
FIG. 17: schematically represents a top view of the arrangement in FIGS. 14-16 when the transfer element is in a retracted position.

FIG. 14 schematically represents a partial top view of a further arrangement 82, and FIG. 15 schematically represents a top view of the arrangement 82 in FIG. 14. FIG. 16 schematically represents a partial top view of the arrangement 82 in FIGS. 14 and 15, and FIG. 17 schematically represents a top view of the arrangement 82 in FIGS. 14-16. Mainly differences with respect to FIGS. 1-6 will be described. The arrangement 82 in FIGS. 14-17 comprises a magnet 18 movable linearly between the blocking position 50 and the unblocking position 54. In this specific example, the magnet 18 is guided linearly along rails 84. Also in FIGS. 14-17, the blocking member 48 is constituted by the magnet 18.

In FIGS. 14 and 15, the magnet 18 is in the blocking position 50 where the transfer element 12 is blocked from moving from the protruded position 42 to the retracted position 56. In FIGS. 16 and 17, the magnet 18 is in the unblocking position 54 allowing the transfer element 12 to move to the retracted position 56.

The first arm 22 comprises a first primary finger 86 and a second primary finger 88. The second arm 24 comprises a first secondary finger 90 and a second secondary finger 92. As shown in FIGS. 16 and 17, by applying a current pulse in the first direction through the coil 16, a north pole is established in each of the first primary finger 86 and the second primary finger 88, and a south pole is established in each of the first secondary finger 90 and the second secondary finger 92. The north pole of the first primary finger 86 repels the north pole of the magnet 18 and the south pole of the first secondary finger 90 repels the south pole of the magnet 18. The south pole of the second secondary finger 92 attracts the north pole of the magnet 18 and the north pole of the second primary finger 88 attracts the south pole of the magnet 18. The magnet 18 is thereby caused to move linearly from the blocking position 50 to the unblocking position 54.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An arrangement for locking and unlocking a lock device, the arrangement comprising:
- a transfer element movable between a protruded position and a retracted position;
- a core member of soft magnetic material, the core member comprising a coil section;
- an electric coil wound around the coil section; and
- a blocking member comprising a magnet, the blocking member being movable between a blocking position, in which the magnet establishes a magnetic circuit through the coil section and the blocking member blocks movement of the transfer element to the retracted position, and an unblocking position, in which the magnet establishes a magnetic circuit through the coil section and the blocking member unblocks movement of the transfer element to the retracted position.

2. The arrangement according to claim 1, wherein the blocking member is constituted by the magnet.

3. The arrangement according to claim 1, further comprising a forcing device arranged to force the transfer element towards the protruded position.

4. The arrangement according to claim 1, wherein the blocking member is rotatable between the blocking position and the unblocking position about a rotation axis.

5. The arrangement according to claim 1, wherein the core member comprises two arms.

6. The arrangement according to claim 4, wherein the rotation axis is substantially centered between the arms.

7. The arrangement according to claim 5, wherein the magnet is in contact with each arm in each of the blocking position and the unblocking position.

8. The arrangement according to claim 1, further comprising a base, wherein the transfer element is movable relative to the base, and wherein the blocking member is positioned between the transfer element and the base when the transfer element adopts the protruded position and the blocking member adopts the blocking position.

9. The arrangement according to claim 1, wherein the magnet has a substantially straight elongated shape.

10. The arrangement according to claim 1, wherein the magnet is a permanent magnet.

11. The arrangement according to claim 1, wherein the transfer element comprises a sloped surface.

12. The arrangement according to claim 1, wherein the transfer element is linearly movable between the protruded position and the retracted position along a transfer axis.

13. The arrangement according to claim 12, wherein the blocking member is rotatable between the blocking position and the unblocking position about a rotation axis, and wherein the transfer axis and the rotation axis are substantially parallel.

14. The arrangement according to claim 1, further comprising a control system, the control system comprising at least one data processing device and at least one memory having a computer program stored thereon, the computer program comprising program code which, when executed by the at least one data processing device, causes the at least one data processing device to perform:

evaluating an authorization request; and commanding sending of a current pulse through the coil in response to a granted evaluation of the authorization request.

15. A lock device comprising an arrangement according to claim 1.

16. A method of controlling a lock device, the method comprising:

providing a lock device according to claim 15;

evaluating an authorization request; and sending a current pulse through the coil in response to a granted evaluation of the authorization request.

* * * * *